(12) United States Patent
Lee

(10) Patent No.: US 6,622,025 B2
(45) Date of Patent: Sep. 16, 2003

(54) METHOD AND APPARATUS FOR ENTERING NUMBERS

(75) Inventor: Parkjoo Lee, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 152 days.

(21) Appl. No.: 09/966,486

(22) Filed: Sep. 28, 2001

(65) Prior Publication Data

US 2003/0064710 A1 Apr. 3, 2003

(51) Int. Cl.[7] .............................. H04B 1/38; H04M 1/00
(52) U.S. Cl. ................................... 455/550; 379/433.07
(58) Field of Search ......................... 455/550, 90, 566, 455/575, 565, 347, 351; 379/433.01, 433.04, 433.07

(56) References Cited

U.S. PATENT DOCUMENTS 5,754,645 A    5/1998  Metroka et al.
6,226,534 B1 * 5/2001  Aizawa ........................ 455/566

* cited by examiner

Primary Examiner—Nguyen T. Vo
(74) Attorney, Agent, or Firm—Shigeharu Furukawa

(57) ABSTRACT

At least two key switches corresponding to one or more keys, for example on the side of the radiotelephone device or on the standard keypad of the radiotelephone device, can be used to dial a phone number, therefore, eliminating the need to use the entire standard keypad. One key switch is used to increment a candidate number and a one key switch is used to decrement the candidate number. The sound file corresponding to the candidate number scrolled is output through the speaker of the radiotelephone device. One key switch is used to select the candidate number and store the number as a digit of a phone number. The digit is stored within the call register. Once the entire phone number is selected and stored, a key switch is actuated to dial the entire phone number.

21 Claims, 3 Drawing Sheets

METHOD AND APPARATUS FOR ENTERING NUMBERS

FIELD OF THE INVENTION

The present invention relates generally to portable communication devices, and in particular, relates to a user input for entering information or commands into a portable communication device.

BACKGROUND OF THE INVENTION

Portable communication devices have keypads that the user employs for various purposes such as to enter alpha-numeric characters or commands. Portable communication devices include: radiotelephones, pagers, personal digital assistants (PDA), two-way radios, accessories for use therewith, and the like. Radiotelephones, for example, typically have a matrix keypad with three columns and four rows for entering the numbers 0–9, the letters a through z (some without q and z), and the "#" and "*" symbol. Cellular radiotelephones also include function keys, for example SND, END, and CLR for entering commands. Pushing a key enters the desired data into the radiotelephone device. The radiotelephone device interprets the data, for example a phone number when the numbers on the standard keypad are actuated, or executes a function, for example dialing a phone number when the SND key is actuated. Although users are very familiar with standard keypads, they are relatively large, require two-hands to hold the phone and dial the number, and most users must look at the keys during dialing.

Some radiotelephone devices have a hands-free voice dialing function, or voice recognition mode, to facilitate hands free operation. In voice recognition mode, the user's speech, such as a name, phone number or a phone command, is converted to data and compared to individual pre-stored data sets. The pre-stored data sets correspond to pre-recorded speech provided during a registration process. The input speech is matched to a data set, whereby a positive speech recognition result is obtained. When a match occurs, an automatic dialing operation is executed. Although voice recognition systems provide a means for inputting alphanumeric information and controlling device operation without using a full keypad, they are not provided on all portable communication devices. Additionally, voice control operation can be adversely impacted by environmental noise or a change of user.

What is needed is a method of inputting data and controlling radiotelephone device operation that is easy to use, reliable and can be operated using fewer keys.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numbers identify like elements, and wherein:

DETAILED DESCRIPTION OF THE PREFERRED EMBODIMENT

A method and apparatus improves numeric data entry in a portable communication device, as for example dialing a phone number on a radiotelephone device. Keys, for example keys on the side of a radiotelephone device or in the standard keypad, can be used to dial a phone number, eliminating the need to use the entire standard keypad. For selecting a numeric input, a key is used to increment a candidate number and a key is used to decrement the candidate number. Key actuation is used to select and store the current candidate number as the digit of a phone number. Audible feedback is provided to the user through the speaker of the radiotelephone device each time the user scrolls to a new candidate number either by incrementing or decrementing the preceding candidate number. Once all of the digits in the phone number sequence have been selected, a key is actuated to command the radiotelephone device to dial the phone number. By using 3 or fewer keys, a one handed dialing mode and an Eyes Free Dialing mode are enabled. Eyes Free Dialing is a method of dialing a phone number without having to look at the keypad.

Figure 1:
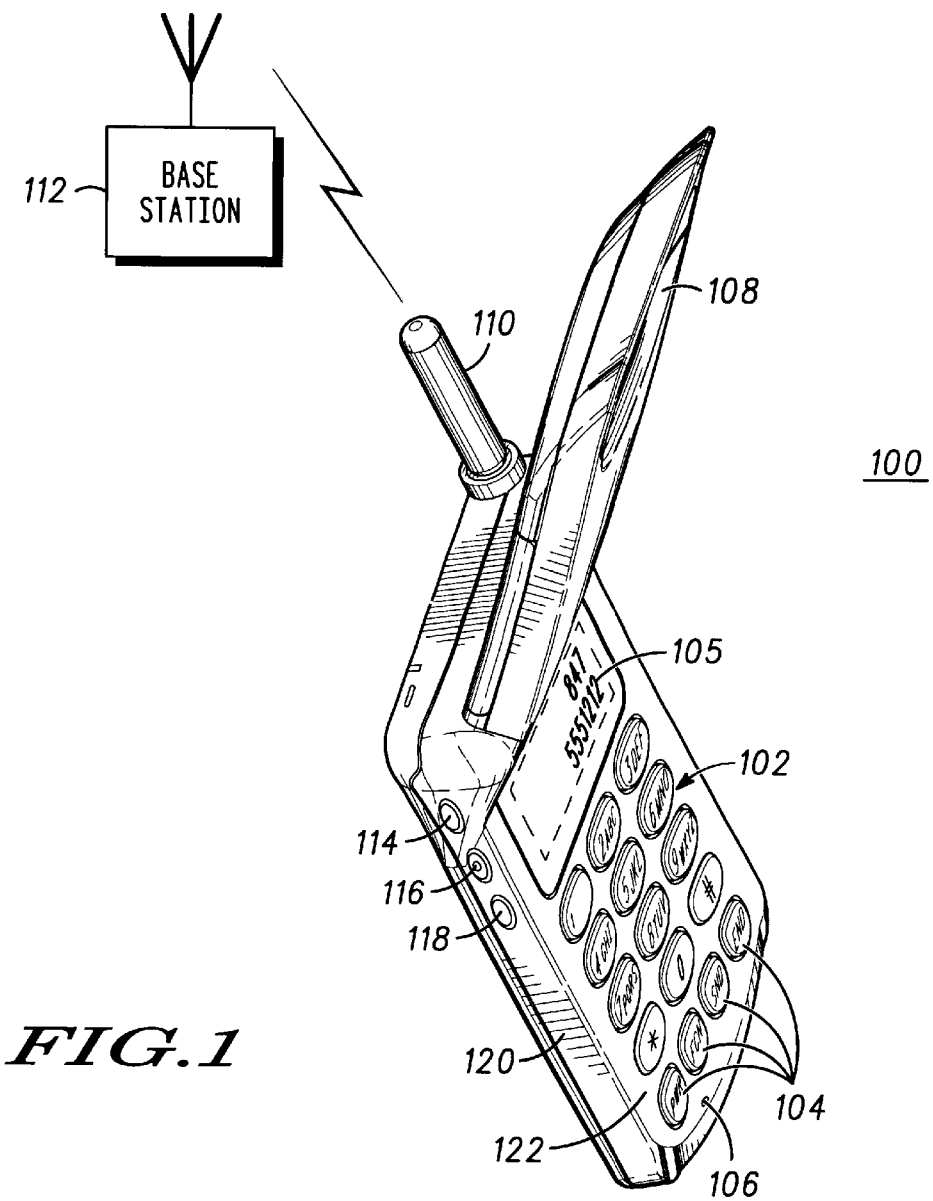
FIG. 1 is a perspective view of a radiotelephone device.

FIG. 1 is a perspective view of radiotelephone device. Radiotelephone 100 has standard keypad 102 that includes the typical twelve key matrix (3 columns, 4 rows). This matrix includes respective keys for the numbers 0–9. The 2–9 keys are also used to input the letters a–z in known radiotelephones that support alphabetic characters. The twelve key matrix is completed by an "*" key and "#" key. Display 105 provides information to the user, such as visual feedback of entered characters. Keypad 102 further includes function keys 104, for example SND, END, and CLR, which are used to enter commands into radiotelephone device 100. The user interface for the radiotelephone device 100 further includes a microphone 106 and a speaker 108. An antenna 110 supports wireless communication with a base station 112.

As illustrated in FIG. 1, there are three additional keys 114, 116 and 118 provided on a sidewall 120 of housing 122. The keys may be implemented using any suitable commercially available push button switch, such as a dome switch or a toggle switch. Keys 114, 116, and 118 are used for Eyes Free Dialing mode, which will be described in greater detail herein below. It is envisioned that matrix keys on standard keypad 102 could be used to operate Eyes Free Dialing mode. It is also envisioned that side keys 114, 116, 118 could be used for other functions such as menu manipulation and volume control in addition to Eyes Free Dialing mode.

It is envisioned that radiotelephone device 100 is capable of operating in many different modes, including, voice recognition mode, full keypad mode, and Eyes Free Dialing mode. It is also envisioned that the phone can support ordinary voice operation as well as Internet browsing, messaging, gaming, and the like.

Figure 2:
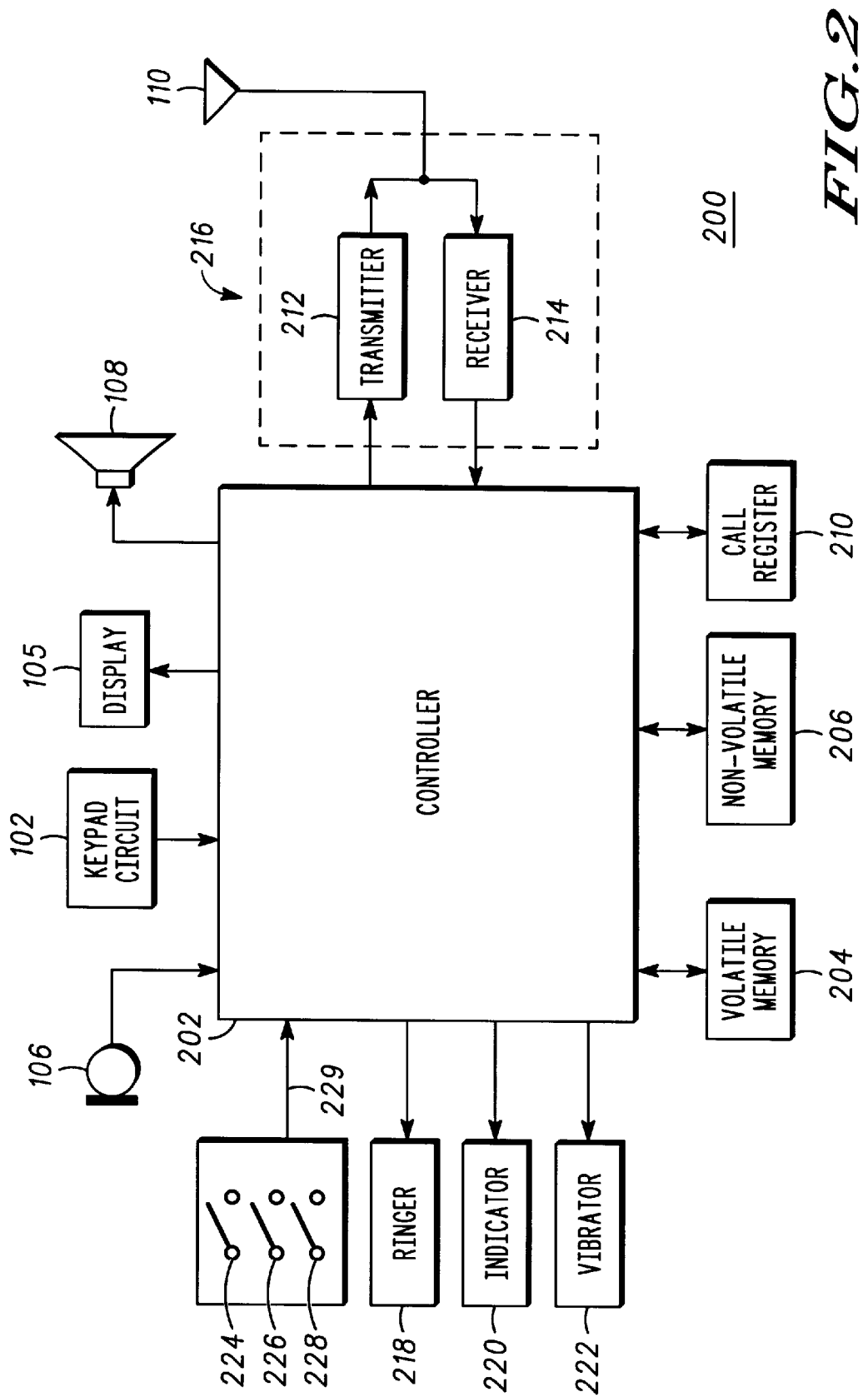
FIG. 2 is an electrical block diagram of dialing a phone number using keys on a radiotelephone device.

FIG. 2 is an electrical block diagram illustrating a circuit 200 positioned within in radiotelephone device 100. Circuit 200 includes a controller 202, or central processing unit (CPU), which may be a microprocessor, a micro-controller, a digital signal processor (DSP), a programmable logic unit, or the like, or a combination thereof. Controller 202 can include volatile memory 204, which may for example be random access memory (RAM), and non-volatile memory 206, which may be implemented using Electronically Erasable Programmable Read Only Memory (EEPROM), Flash Electronically Programmable Read Only Memory (Flash EPROM), EPROM, or the like. Controller 202 is connected to keypad 102. Controller 202 is connected through a bus 229 to key switches 224, 226, 228 which are actuated by keys 114, 116, 118, respectively. Controller 202 is also connected to speaker 108 that outputs audio and a microphone 106 that inputs audio. Controller 202 drives display 105 that is used to show information to the user. Controller 202 is coupled to a call register 210 used for storing digits that make up a phone number. Antenna 110, a radio frequency (RF) input, is connected between the transmitter 212 and receiver 214 of the transceiver 216. Transmitter 212 transmits data from the controller 202 and receiver 214 receives data and relays the information to controller 202. Ringer 218, indicator 220, and vibrator 222 are alerts for the user and are coupled to controller 202.

Controller 202 selectively controls the operation of radiotelephone device 100 including Eyes Free Dialing mode. Keys 114, 116, 118 on the side of radiotelephone device 100 or on keypad 102 of the radiotelephone device 100 operates Eyes Free Dialing mode. Each key 114, 116, 118 is linked to key switch 224, 226, 228. Each key 114, 116, 118 sends a signal through bus 229 to controller 202.

Figure 3:
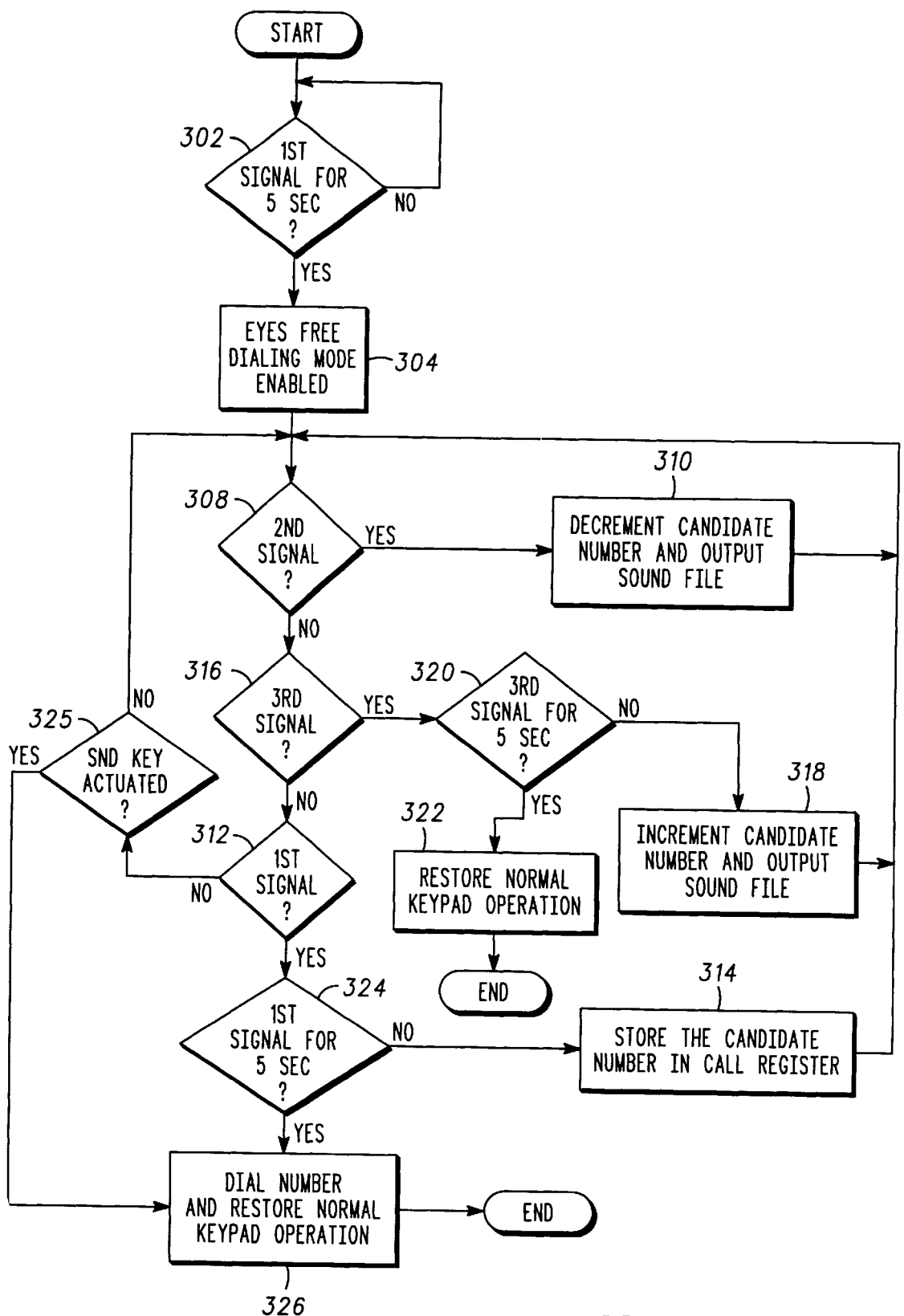
FIG. 3 is a flow chart of dialing a phone number using keys on a radiotelephone device.

In operation, the controller 202 determines if a first signal from key switch 226 is held for a predetermined time period, which is illustrated as 5 seconds, as indicated in decision block 302 (FIG. 3). If the signal is terminated prior to expiration of the time period, the controller does not enter eyes free dialing mode. If it is determined that the first signal remains for 5 seconds, the controller enables Eyes Free Dialing mode as indicated in block 304. Five seconds is used for illustrative purposes only, and one of ordinary skill in the art will recognize that any duration of time may be implemented. When Eyes Free Dialing mode is initiated, the first candidate number for the first digit of the telephone number is set to 5. An audible alert is sent from controller 202 through speaker 108 to notify the user that Eyes Free Dialing mode is enabled and active as indicated in block 306. Additionally, the controller controls display 105 to generate the number 5 in the first digit position on display 105.

Once Eyes Free Dialing mode is in operation, the controller is responsive to signals from the switches associated with keys 114, 116, or 118 to either change or select the current candidate number. If it is determined in step 308 that the second signal is present because of the closure of key switch 224, indicating key 114 is actuated, controller 202 responds by decrementing the candidate number by one as indicated in block 310. Immediately after key 114 is actuated, the sound file for that particular number stored within the non-volatile memory 206 is read as indicated in block 310. A different sound file is associated with each key on standard keypad 102, for example sound file "beep" for function key SND, sound file "one" for the number 1, sound file "two" for the number 2, sound file "three" for the number 3. A different sound file is preferably provided for each number that is entered by the user, and most preferably in a language selected by the user. Any suitable commercially available software for converting sound files to audio outputs can be used. The sound file is converted to an audio signal output through speaker 108 of radiotelephone device 100. The sound file output through speaker 108 alerts the user of the current candidate number. Additionally, the optional candidate number on display 105 is updated for visual feedback to the user.

If the controller detects the third signal associated with closure of switch 228, as determined at decision block 316, the controller checks to see if the third key is held for 5 seconds at decision block 320. If it is not held for 5 seconds, the candidate number is incremented in step 318. In this manner, when key 118 is actuated, the controller responds to the signal from the closure of a third key switch 228 by incrementing the candidate number by one. Immediately after key 118 is actuated, the sound file for that particular candidate number stored within non-volatile memory 206 is read. The sound file is output through speaker 108 of the radiotelephone device 100 as also indicated in block 318. The sound file output through speaker 108 alerts the user of the candidate number that is currently selected. Additionally, the optional candidate number in display 105 is incremented also.

If the first signal is detected, as determined in block 312, the controller determines whether the signal persists for a predetermined time period in decision block 324. If the controller 202 detects the first signal for less than 5 seconds, as indicated in blocks 312 and 324, the current candidate number is stored in the call register 210 as the digit, as indicated in block 314. The digit selected is communicated to the user through the speaker 108, and optionally through the display 105. The candidate number of the next digit of the telephone number is initialized at 5 in step 314, and the controller returns to step 308.

The process of incrementing, decrementing, and selecting candidate numbers is repeated until the third signal is present for more than 5 seconds, as determined in step 320, the first signal is present for more than 5 seconds as determined in step 324, or the send key is actuated as determined in step 325. Thus, the user can cause the controller to dial the number in call register 210 by actuating key 116 for 5 seconds or more or pressing the send key, as indicated in block 326. Five seconds is again used for illustrative purposes only, and one of ordinary skill in the art will recognize that any duration of time may be implemented. In block 326, the controller 202 retrieves the phone number stored within the call register 210. The phone number is made up of the plurality of digits entered in through incrementing, decrementing and selecting characters as described above. Radiotelephone device 100 dials the phone number retrieved from call register 210 in a conventional manner. A transmit control signal is generated by the controller 202 responsive to which transmitter 212 outputs the encoded phone number. Call register 210 is cleared once the telephone number is retrieved, or when the user initiates entry of a new telephone number. After the phone number is sent, Eyes Free Dialing mode ends.

Eyes Free Dialing mode is disabled at anytime during operation responsive to the third signal being present for a predetermined time period, such as 5 seconds. Controller 202 responds to the third signal sent through bus 229 from key switch 114 to disables Eyes Free Dialing mode. It is envisioned that digits entered into call register 210 will not be cleared. For example, a user can implement Eyes Free Dialing mode to select the first three digits of a telephone number, disable Eyes Free Dialing mode and use standard keypad operation to select the last four digits of a telephone number.

Thus it can be seen that controller 202 sets the candidate number to 5 every time Eyes Free Dialing is enabled, and each time selection of an additional digit in the phone number is initiated. When Eyes Free Dialing mode is enabled, the first candidate number for the first digit is always the number 5. The user closes switches 224 and 228 to increment and decrement the candidate character. Switch 226 is closed to select the current number for the current digits. The candidate numbers stored in the call register, and candidate numbers re-initialized to 5 for the next sequential digit. The user will increment, decrement or select the candidate number for that next digit until it is selected. The process will be repeated until the user either stores the entire digit string as the telephone number, and uses the first key or the SND key cause transmission of the stored telephone number. Each time the candidate number changes, a user perceptible feedback is generated through the user interface. It is envisioned that the entire phone number can be communicated to the user audibly when the telephone number is dialed to provide additional feedback.

Figure 4:
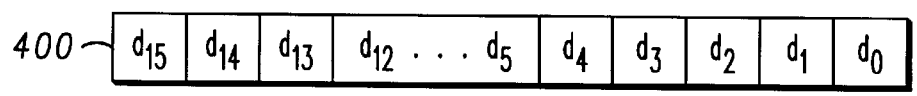
FIG. 4 is a data register of a radiotelephone device.

In one embodiment of the invention, a data register 400 (FIG. 4) within controller 202 is used to store the status of the digit selection method described herein above. The data register can include any number of bits, but will typically include 16 bit or 32 bits. Bits $d_0$ through $d_3$ of the data register are used to represent the numbers 0–9. Controller 202 registers the input signals from keys 114, 116, 118 in a respective bits of the buffer. Each signal corresponds to a respective bit within the data register 400 in controller 202. For example, upon detecting the first signal from key 116 for 5 seconds, controller 202 sets bit $d_7$ to a high logic level. This flag indicates Eyes Free Dialing mode is enabled. The controller sets the bits d3–d0 to 0101, indicating the number 5. When the second signal from key 116 is detected, controller 202 sets bit $d_4$ to a high logic level. The candidate number represented in binary by bits $d_0$ to $d_3$ is decremented by one. Once decremented, controller 202 resets bit $d_4$ to a low logic level. When signal 3 is input, responsive to actuation of key 118, the controller sets bit $d_6$ to a high logic level. The candidate number represented by bits $d_0$ to $d_3$ is incremented by one. Once incremented, controller 202 resets bit $d_6$ to a low logic level. Those skilled in the art will recognize that as used herein, set represents a high logic level, but could alternatively be represented by a low logic level.

Those skilled in the art will recognize that the invention could be implemented using means other than a data register as described above. For example using an interrupt-based design. Interrupt-based design uses interrupt signals for initiating eyes free dialing mode and detecting when a key is actuated. When there is an interrupt to the CPU, the CPU will use the interrupt signals for detecting any changes in status of eyes free dialing mode.

As described hereinabove, the user can exit the eyes free dialing mode without sending a telephone number. When key 118 is actuated for a predetermined time period, such as 5 seconds, as detected in step 320, Eyes Free Dialing mode is disabled and normal keypad mode of operation is initiated as indicated in block 322. An example of where this would be beneficial is when selects the first three numbers of a telephone number using Eyes Free Dialing mode and then switches to using the keypad. Another example of where this feature is advantageous is when the user inadvertently actuates Eyes Free Dialing and wishes to terminate the operating mode.

Although described with respect to three keys, those skilled in the art will recognize that two keys, or a rocker switch could be used. For example, in the two key arrangement, both keys could be activated to generate the first signal, one key can generate the second signal to cause the controller to decrement the candidate number, and the other key can generate the third signal to cause the controller to increment the candidate character. For the rocker switch, the switch preferably pivot up to generate the second signal and thus cause the controller to increment the candidate number, pushes-in to generate the first signal, and pivots down create the third signal responsive to which the candidate number is decremented.

While a particular embodiment of the present invention has been shown and described, modifications may be made. It is therefore intended in the appended claims to cover all such changes and modifications that fall within the true spirit and scope of the invention.

What is claimed is:

1. A portable communication device, comprising:
   a controller to control operation of the portable communication device;
   a memory coupled to the controller, the memory storing information;
   a user interface coupled to the controller, the user interface including key switches generating first, second and third signals input to the controller for controlling number selection, the controller responsive to the first signal to initialize a candidate number, the controller responsive to the second signal to decrement the candidate number, the controller responsive to a third signal to increment the candidate number, and the controller responsive to the first signal to select the candidate number, and the controller operable to cause generation of a user perceptible output from the user interface each time the candidate number changes.

2. The portable communication device as defined in claim 1, wherein the key switches include first, second and third key switches, and wherein the first signal is associated with the first key switch, the second signal is associated with the second key switch, and the third signal is associated with the third key switch.

3. The portable communication device of claim 2, wherein the first key switch is positioned between the second and third key switch.

4. The portable communication device of claim 2, wherein the first, second and third key switches are located on a side wall of the portable communication device.

5. The portable communication device as defined in claim 1, wherein the memory stores sound files.

6. The portable communication device as defined in claim 5, wherein the user interface includes a speaker, the controller controlling the sound files to be communicated to the speaker to audibly output the new candidate number each time it changes.

7. The portable communication device as defined in claim 1, wherein the user interface includes a keypad.

8. The portable communication device as defined in claim 7 wherein the key switches are associated with the keypad.

9. The portable communication device as defined in claim 7, further including a housing having a front and a side, the keypad carried on the front and the key switches carried on the side.

10. The portable communication device of claim 7, the controller further operable to control the portable communication device to selectively operate in full keypad input mode and key switch mode.

11. The portable communication device as defined in claim 1, further including a wireless transceiver positioned in the housing.

12. The portable communication device of claim 1, further including a call register to store a telephone number input via the key switches.

13. The portable communication device of claim 12, wherein the controller is further responsive to the first signal to generate a transmit control signal for causing transmission of the telephone number.

14. The portable communication device of claim 1, the memory storing voice recognition software, and where the controller is selectively operable to control the portable communication device in a voice actuated control mode.

15. The portable communication device of claim 1, wherein the controller controls the portable communication device to have an initial candidate number of 5.

16. A method of inputting a number in a portable communication device by establishing a number entry mode, the portable communication device including a controller, a memory storing sound files and a user interface having input keys and a transducer, the input keys producing first, second and third signals, the method comprising the steps of:

responding to initial presence of the first signal for a first predetermined time period to initialize a candidate number;

providing a human perceptible indication of the initial candidate number;

responding to the second signal to decrement the candidate number;

responding to the third signal to increment the candidate number;

outputting a human perceptible indication of the candidate number each time the candidate number changes; and storing the candidate number in a call register as a digit of a phone number responsive to the first input signal.

17. The method of claim 16, after the step of storing the candidate number for a digit of the phone number, further including the step of re-initializing the candidate number for another digit of the phone number.

18. The method of claim 16, further including the step of transmitting the phone number responsive to detecting one of a send key signal and the presence of the first signal for a second predetermined period of time.

19. The method of claim 18, wherein the first and second predetermined period of time are substantially equal.

20. The method of claim 18, further including the step of changing the number entry mode responsive to detecting one of the second and third signals for a third predetermined period of time.

21. A portable communication device, comprising:

a housing having at least a front and a side;

a keypad positioned on the front of the housing, the keypad used to input information into the portable communication device;

a wireless transceiver positioned in the housing, the transceiver used to transmit and receive information;

a controller coupled to the keypad and the wireless transceiver and selectively controlling the operation of the portable communication device, the controller controlling the portable communication device to selectively operate in eyes free input mode and a keypad dialing mode;

a memory coupled to the controller, the memory storing sound files to be communicated to a user at least during eyes free input mode;

a speaker coupled to the controller;

first, second, and third keys positioned on the side of the housing; and a first, second and third key switches positioned to be responsive to the first, second and third keys, respectively, wherein the first, second and third key switches are coupled to the controller, the controller responsive to the first key switch to initiate eyes free input mode and store a candidate number in a call register, the controller responsive to the second key switch to decrement the candidate number each time the second key switch is actuated, and the third key switch to increment the candidate number each time the third key switch is actuated.

* * * * *